May 22, 1945.  C. J. RINGLE ET AL  2,376,384
DENTAL SURVEYING INSTRUMENT
Filed Dec. 15, 1942  2 Sheets-Sheet 1
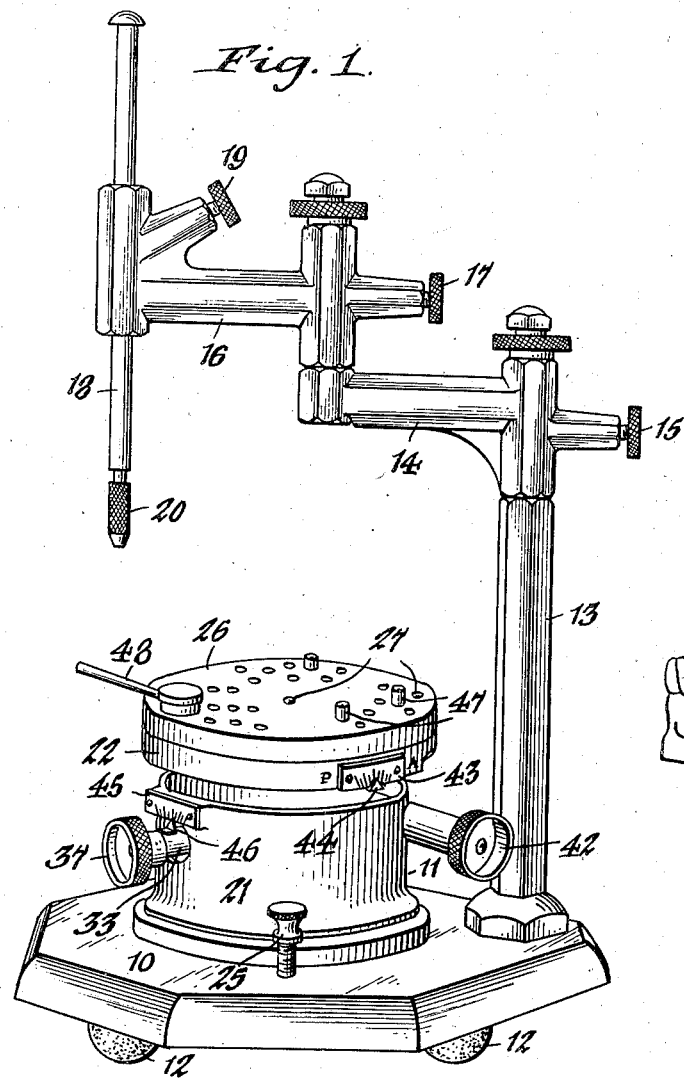
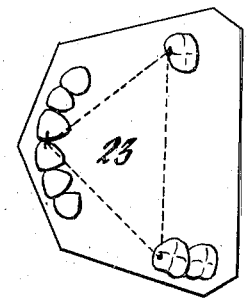
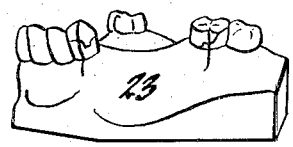
Inventors,
Charles J. Ringle,
Gerald N. Hiatt,
Roy W. Smith,
by Walter P. Geyer
Attorney.

Patented May 22, 1945

2,376,384

UNITED STATES PATENT OFFICE 2,376,384

DENTAL SURVEYING INSTRUMENT

Charles J. Ringle, Gerald H. Hiatt, and Roy W. Smith, Buffalo, N. Y., assignors to Williams Gold Refining Company, Inc., Buffalo, N. Y., a corporation of New York Application December 15, 1942, Serial No. 469,130

4 Claims. (Cl. 32—32)

This invention relates to a micrographic surveying instrument which has been primarily designed for dental use, and particularly for scientifically surveying partial denture cases to accomplish permanent stability and retention.

It has for one of its objects to provide a simple, accurate and practical instrument of this character which is so designed as to permit the scientific survey of the teeth to be used for clasping and to ascertain the areas thereof with most suitable undercuts and thereafter drawing in the survey lines so as to divide the buccal and lingual planes into segments for simplifying the selection of the correct clasp design and the proper placement of the clasps.

Another object of the invention is to provide a dental surveyor having a universally movable model-supporting table having precision-controlled means for adjusting and indicating its degree of tilt in any direction and wherein the adjustment of the anterior-posterior degree of tilt does not alter the minus-plus degree of tilt or vice versa.

A further object is to provide a simple and novel means for anchoring the model in its surveying position on the working table and to enable the operator to keep a record of such position and thereby insure exact replacing of the model when desired for future study.

A still further object of the invention is to provide an efficient dental instrument of this character having a novel and flexible tool holder mounting unit which is movable relative to and over the entire area of the working table and whereby the surveying tools employed may be readily adjusted in horizontal and vertical planes for operative engagement with the clamped model.

Other features of the invention reside in the construction and arrangement of parts hereinafter described and particularly pointed out in the appended claims.

Figure 2:
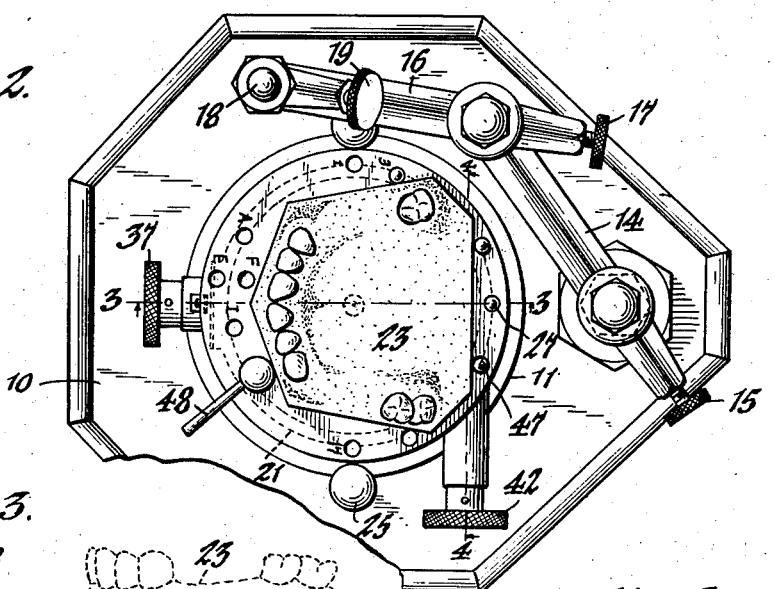
Figure 3:
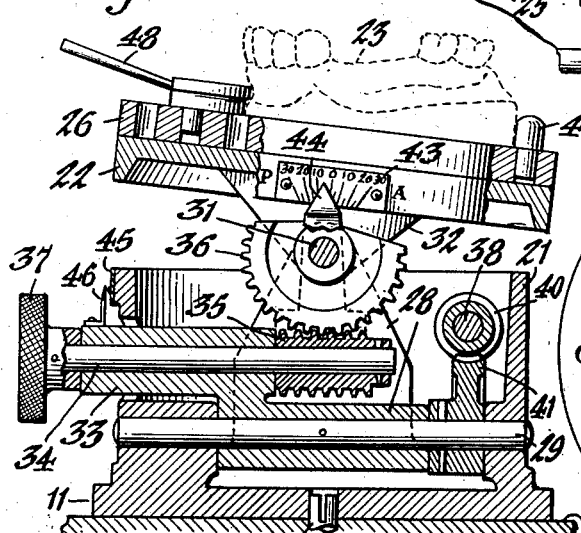
Figure 5:
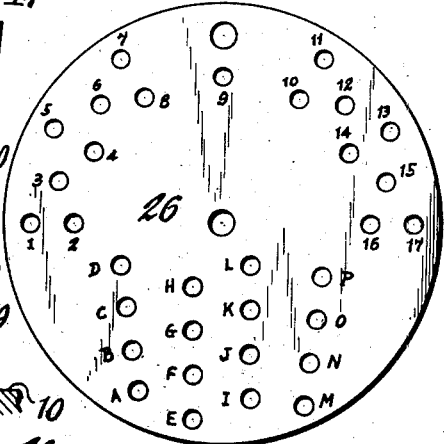
Figure 4:
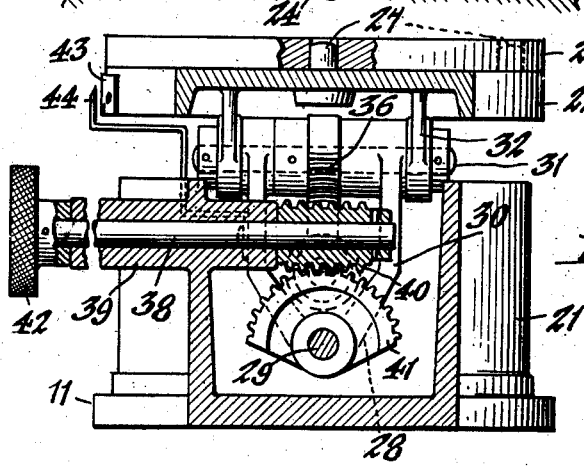

In the accompanying drawings:

Figure 1 is a perspective view of the surveying instrument embodying our invention. Figure 2 is a top plan view thereof, partly in section. Figures 3 and 4 are cross sections taken in the correspondingly numbered lines in Figure 2. Figure 5 is a top plan view of the removable model-supporting plate. Figure 6 is a top plan view of a model to be surveyed showing the three load points thereof located and established on a horizontal triangle by our instrument. Figure 7 is a side view thereof showing the survey lines marked by the surveyor on the teeth to be used for clasping. Figures 8, 9 and 10 are side elevations of the pointer, straight edge and marker tools used with the apparatus.

Similar characters of reference indicate corresponding parts throughout the several views.

In its general organization, our improved micrographic surveyor comprises a base or platform having a standard rising therefrom on which is mounted a flexible or adjustable arm structure for individually and detachably supporting the surveying tools, such as a pointer for exploring the model in locating the load or rest points, a straight edge for preliminary study of individual tooth planes, and graphite markers for drawing in the survey lines; and a surveying mechanism adapted to be detachably mounted on the base to rotate thereon or to be held fast thereto and having a tiltable or universally movable working table surmounting the same for precision-controlled movement in any direction to posterior and anterior angles of tilt or at right angles thereto in minus-plus angles of tilt, such table including a removable working plate upon which the model to be surveyed is removably mounted and wherein adjustable anchoring means, whose positions may be recorded for future study of a given model, are provided for positively holding the model in a firm position on the working plate. With this instrument the model can be readily and efficiently explored for locating the load or rest points on a horizontal triangle to provide the proper balance for stabilization, after which a preliminary study of the individual tooth planes may be performed and compensating adjustments made of the horizontal-occlusal plane as required to equalize load distribution. Following these surveys, the buccal and lingual planes of each tooth are checked to ascertain areas with most suitable undercuts for clasping, and the survey lines drawn to show the height of contour on each tooth to be so used, all to the end of simplifying the selection of the correct clasp and the proper placement of the clasps.

The numeral 10 indicating the base or platform on which the various working parts of the surveyor are mounted, is smoothly machined in a horizontal plane on its top side to provide a support for the surveying mechanism, indicated generally by the numeral 11, while its bottom side is provided with non-slip supporting feet 12. Rising from this base at one side thereof is a post or standard 13 on which is mounted a double-hinged or vertically-jointed, tool-carrying arm including an inner or primary section 14 pivoted about a vertical axis to the post and having a knurled-knob fitting 15 associated therewith for frictionally holding the arm in a set position. The companion outer or secondary section 16 of this jointed arm is pivoted at its inner end about a vertical axis to the outer end of the primary arm-section, being adjustably and frictionally held in any desired set position by a knurled-knob fitting 17. Fitted in the outer end of the secondary arm-section 16 is a vertically-slidable spindle 18 which is adjustably and frictionally held at any desired elevation pendant from the arm by a suitable adjustable fitting 19. At its lower end this spindle is provided with a chuck 20 to individually and detachably accommodate the surveying tools used in conjunction with our instrument. The hinge pivots of the double-hinged arm 14, 16 are preferably provided with extra long precision-machined bearings to reduce play to a minimum and insure precise and accurate adjustment of the arm during the surveying operation.

In Figures 8, 9 and 10 we have shown, by way of example, three surveying tools, that in Figure 8 showing the pointer used for exploring the model and locating the load or rest points on the teeth of the model, in a triangular horizontal plane to provide for equalized load distribution and balance for stabilization; in Figure 9 is shown the straight-edged tool which is used for the preliminary study of individual tooth planes to ascertain variations off the vertical; and in Fgure 10 is shown a graphite triangle marker for drawing the survey lines to show the height of contour on each tooth to be used for clasping.

Mounted on the top side of the base 10 to be rotated thereon at will, or to be clamped in a fixed position thereto, is the casing 21 of the surveying mechanism which carries a universally-movable working table 22 for supporting the model 23 to be surveyed. A centering pin 24 rises from the base and engages a companion opening in the bottom of the casing to enable the latter to be rotated relatively to the base, when desired. Clamping screws 25 fitted into the base 10 and engaging the flanged bottom of the casing serve to detachably secure the latter to the base. The casing is cylindrical in shape and the working table 22 surmounts the same for tilting movement in any direction to the horizontal, the sliding spindle 18 overhanging the table for vertical adjustment relative thereto and through the medium of the double-hinged arm 14, 16 is adapted to be moved laterally relatively to the table over the entire area thereof to perform the surveying operations. By preference, a removable working plate 26 is applied to the top side of the table 22 and the model 23 is anchored thereto. This working plate is centered and held against lateral displacement on the table by means of pins 27 rising from the latter and engaging companion openings in the plate.

The means for effecting the universal adjustment of the tiltable table 22 in establishing the load points on a horizontal triangle to assure requisite balance of stabilization is preferably constructed as follows:

The numeral 28 indicates a shiftable yoke which is fastened at its lower end on a horizontal pivot shaft 29 extending diametrically across and journaled in the lower portion of the casing 21, while its upper end terminates in bifurcated arms 30 in which is journaled a horizontal shaft 31, disposed at right angles to the pivot-shaft 29. Depending from the working table are spaced arms 32 which are connected to the opposite end of the shaft 31, so that when the latter is turned in one direction or the other the working table is correspondingly tilted in anterior and posterior directions. This yoke is provided between its pivoted lower end and its bifurcated upper portion with a bearing portion 33 disposed parallel to the pivot-shaft 29 and in which is journaled an actuating shaft 34 having a worm 35 thereon meshing with a worm wheel sector 36 pinned on the shaft 31. At its outer end the shaft 34 is provided with an actuating knob 37 for turning it and the worm gears to tilt the working table in anterior and posterior directions. The tilting movement of the working table in the opposite direction, that is, its minus and plus movement, is controlled by an actuating shaft 38 disposed at right angles to the companion actuating shaft 34 and journaled in a bearing 39 in the casing 21 and having a worm 40 mounted thereon engaging a worm wheel sector 41 fixed on the yoke-pivoting shaft 29. At its outer end the shaft 38 is provided with an actuating knob 42 for turning it and the corresponding worm gears to tilt the working table in a lateral or minus-plus direction. Suitable indicators are provided for registering the degree of anterior and posterior tilt as well as the minus-plus tilt of the working table. For registering the anterior and posterior tilt a graduated scale 43 is applied to one side of the working table and cooperating therewith is a stationary pointer 44 fixed to the side of the adjoining yoke-arm 30, so that as the table is manipulated in its anterior and posterior movements by the actuating knob 37, the scale 43 is tilted with it relative to the pointer. For registering the minus-plus tilt the casing 21 is provided with a graduated scale 45 disposed above the axis of the actuating shaft 34 and cooperating therewith is a stationary pointer 46 applied to the adjoining end of the bearing portion 33 of the yoke 28. These indicator scales are graduating in degrees with the zero reading disposed centrally of each scale.

The working plate 26 to which the model 23 is anchored is provided with two groups of holes, one group being numbered from 1 to 17 inclusive, as shown in Figure 5, and the other group being designated by the letters A to P inclusive. Cooperating with the first-named group of holes are removable pegs 47, preferably three in number, which when placed in any three holes serve to anchor any given sized model in place on the working plate. Cooperating with any one of the second-named group of holes is a removable cam lever 48 which is employed for holding the model securely against the anchoring pegs. By this construction a wide range of adjustment is provided for fastening models of various sizes and shapes to the working table.

We claim as our invention:

1. In a dental surveying instrument of the character described, a table having a working plate removably applied thereto and adapted to support a model in a clamped position thereon for survey, said plate having two groups of holes therein, anchoring pegs removably engageable with one or another of the holes of one group for anchoring the model in position, and a clamping element removably engageable with one or another of the holes of the other group and adapted to abut against the model for urging it against said pegs.

2. A working plate for anchoring a model in position to be surveyed having two groups of holes in its face at substantially diametrically opposite sides thereof, one group of holes being adapted to receive in one or another thereof anchoring pegs for bearing engagement with the edge of the model, and the other group of holes being adapted to receive in one or another thereof an eccentric clamping element for abutting engagement with the model, for urging it against said pegs.

3. A working plate for anchoring a model in position to be surveyed having two groups of holes in its face at substantially diametrically opposite sides thereof, one group of holes being adapted to receive in one or another thereof anchoring pegs for bearing engagement with the edge of the model, and the other group of holes being adapted to receive in one or another thereof an eccentric clamping element for abutting engagement with the model for urging it against said pegs, the holes of both groups being identified by distinguishing characters whereby a record may be kept of the anchoring positions of the pegs and clamping element for replacement of a given model in its same position on the plate for future survey purposes.

4. The combination with a base having a standard rising from one side thereof and a laterally-swinging arm radiating therefrom in overhanging relation to the base and having means at the outer end for detachably suspending a surveying tool, of a cylindrical casing mounted on said base and having a universally tiltable table surmounting the same and adapted to support a model to be surveyed by said tool, a yoke pivoted at its lower end centrally of the casing and to the upper end of which said table is pivoted for movement about an axis at right angles to that of the yoke-pivot, a pair of manually controlled actuating shafts for tilting the table about its own and the yoke-pivot, one of said shafts being journaled on the casing at one side thereof and in operative driving engagement with the yoke-pivot to turn the same in one direction or the other, and the other shaft being journaled in said yoke at right angles to the companion shaft and in operative driving engagement with the table-pivot to turn the same in one direction or the other, and means for registering the degree of tilt of the table in anterior-posterior and minus-plus directions including a graduated scale applied to the side face of the casing radially of the yoke-journaled actuating shaft and a similar scale applied to the side face of the table radially of the table-pivot, and pointers applied to said yoke at right angles to each other and in relative traversing relation with the respective scales.

CHARLES J. RINGLE.
GERALD H. HIATT.
ROY W. SMITH.